(12) United States Patent
Pervan et al.

(10) Patent No.: US 11,130,325 B2
(45) Date of Patent: *Sep. 28, 2021

(54) PANEL FORMING (71) Applicant: Ceraloc Innovation AB, Viken (SE)

(72) Inventors: Darko Pervan, Viken (SE); Tony Pervan, Stockholm (SE)

(73) Assignee: CERALOC INNOVATION AB, Viken (SE)

( * ) Notice: Subject to any disclaimer, the term of this patent is extended or adjusted under 35 U.S.C. 154(b) by 527 days.

This patent is subject to a terminal disclaimer.

(21) Appl. No.: 15/673,842

(22) Filed: Aug. 10, 2017

(65) Prior Publication Data

US 2017/0334184 A1 Nov. 23, 2017

Related U.S. Application Data (63) Continuation of application No. 13/606,878, filed on Sep. 7, 2012, now Pat. No. 9,757,928.

(Continued)

(51) Int. Cl.
*B32B 37/00* (2006.01)
*B29B 13/02* (2006.01)
(Continued)

(52) U.S. Cl.
CPC .......... *B32B 37/0015* (2013.01); *B27H 1/00* (2013.01); *B29B 13/02* (2013.01); *B32B 21/042* (2013.01);
(Continued)

(58) Field of Classification Search
CPC ... B32B 37/0015; B32B 21/08; B32B 21/042; B32B 37/10; B32B 2038/0076;
(Continued)

(56) References Cited

U.S. PATENT DOCUMENTS 4,046,937 A    9/1977    McCaskey, Jr. et al.
4,405,690 A    9/1983    Brooker et al.
(Continued)

FOREIGN PATENT DOCUMENTS

DE    195 30 778 C1    1/2000
EP    1 035 255 A1    9/2000
(Continued)

OTHER PUBLICATIONS

International Search Report issued in PCT/SE2012/050947, dated Jan. 4, 2013, 7 pages, Patent-och registreringsverket, Stockholm, SE.

(Continued)

*Primary Examiner* — Seyed Masoud Malekzadeh
(74) *Attorney, Agent, or Firm* — Buchanan Ingersoll & Rooney P.C.

(57) ABSTRACT

A method for forming of a building panel with a surface including a thermosetting resin such that tension created during curing of the surface is reduced or eliminated. Method for producing a panel with a wood based core and a surface layer including a thermosetting resin wherein the method including: curing and connecting the surface layer to the core while applying heat and pressure in a first main pressing step, thus raising a temperature of the surface layer above an initial temperature; applying a bending force on the panel after the first main pressing step to bend the panel such that an uppermost surface of the panel is convex an a lowermost surface of the panel is concave while the panel is still above the initial temperature; and releasing the bending force such that the panel springs back to an essentially flat shape.

25 Claims, 6 Drawing Sheets

Related U.S. Application Data (60) Provisional application No. 61/532,753, filed on Sep. 9, 2011.

(51) Int. Cl.
  *B32B 21/04* (2006.01)
  *B32B 21/08* (2006.01)
  *B32B 37/10* (2006.01)
  *B27H 1/00* (2006.01)
  B32B 38/00 (2006.01)
  E04F 15/10 (2006.01)

(52) U.S. Cl.
  CPC .............. *B32B 21/08* (2013.01); *B32B 37/10* (2013.01); *B32B 2038/006* (2013.01); *B32B 2038/0076* (2013.01); *B32B 2317/125* (2013.01); *B32B 2471/00* (2013.01); *E04F 15/102* (2013.01); *E04F 15/107* (2013.01); *Y10T 428/31989* (2015.04)

(58) Field of Classification Search
  CPC . B32B 2317/125; B32B 2471/00; B27H 1/00; B29B 13/02; Y10T 428/31989
  See application file for complete search history.

(56) References Cited

U.S. PATENT DOCUMENTS

| | | | | |
|---|---|---|---|---|
| 5,059,474 | A * | 10/1991 | Yoshida | B32B 27/304 428/174 |
| 6,224,706 | B1 * | 5/2001 | Matich | B32B 7/08 156/212 |
| 6,887,583 | B1 | 5/2005 | Rakauskas | |
| 8,512,804 | B2 * | 8/2013 | Oldorff | B44C 5/0476 427/209 |
| 9,757,928 | B2 | 9/2017 | Pervan et al. | |
| 2003/0232134 | A1 * | 12/2003 | Williams | B32B 37/0038 427/209 |
| 2004/0134587 | A1 | 7/2004 | Broberg et al. | |
| 2009/0145066 | A1 * | 6/2009 | Pervan | B32B 7/12 52/309.15 |
| 2009/0155612 | A1 * | 6/2009 | Pervan | B32B 21/02 428/498 |
| 2010/0300030 | A1 * | 12/2010 | Pervan | B32B 9/02 52/588.1 |
| 2011/0217463 | A1 * | 9/2011 | Oldorff | B05C 1/025 427/209 |
| 2013/0065072 | A1 | 3/2013 | Pervan et al. | |

FOREIGN PATENT DOCUMENTS

| | | | |
|---|---|---|---|
| EP | 2 338 693 | A1 | 6/2011 |
| EP | 2 338 693 | B1 | 6/2012 |
| GB | 1 454 394 | | 11/1976 |
| JP | 08-004263 | A | 1/1996 |
| JP | 08004263 | A * | 1/1996 |
| JP | 08-332607 | A | 12/1996 |
| JP | 11-071892 | A | 3/1999 |
| JP | 11071892 | A * | 3/1999 |
| JP | 2001-277212 | A | 10/2001 |
| JP | 2007-098704 | A | 4/2007 |
| JP | 2009-052201 | A | 3/2009 |
| WO | WO 82/04223 | A1 | 12/1982 |
| WO | WO 97/09166 | A1 | 3/1997 |
| WO | WO 2004/050355 | A1 | 6/2004 |
| WO | WO 2005/021254 | A1 | 3/2005 |
| WO | WO 2009/124704 | A1 | 10/2009 |
| WO | WO 2011/076305 | A1 | 6/2011 |

OTHER PUBLICATIONS

Extended European Search Report issued in EP 12829742.1, dated Jun. 26, 2015, 7 pages, European Patent Office, Munich, DE.
Technical Disclosure Document, PERVAN, Darko, VA074 Panel Forming, IPCOM000210870D, Sep. 13, 2011, 16 pages, http://priorartdatabase.com/IPCOM/000210870.
Extended European Search Report issued in EP 19208906.8, dated Feb. 27, 2020, European Patent Office, Munich, DE, 8 pages.

* cited by examiner

KNOWN TECHNOLOGY

PANEL FORMING

CROSS REFERENCE TO RELATED APPLICATIONS

The present application is a continuation of U.S. application Ser. No. 13/606,878, filed on Sep. 7, 2012, now issued as U.S. Pat. No. 9,757,928, which claims the benefit of U.S. provisional application No. 61/532,753, filed on Sep. 9, 2011. The entire contents of U.S. application Ser. No. 13/606,878 and U.S. provisional application No. 61/532,753 are hereby incorporated herein by reference in their entirety.

TECHNICAL FIELD

The disclosure generally relates to the field of forming of panels, e.g., building panels. More particular, the disclosure relates to a method of forming floor panels and floor panels produced by the method.

KNOWN TECHNOLOGY

Traditional laminated panels, intended to be used for, e.g., flooring or furniture components, are produced by the following steps:
  applying a melamine formaldehyde resin impregnated kraft paper as balancing layer on one side of a core of wood fibre based material for example HDF;
  applying a by melamine formaldehyde resin impregnated printed décor paper on the other side of the core;
  applying a melamine formaldehyde resin impregnated transparent overlay paper with wear resistant particles, for example aluminium oxide, on the décor paper; and
  curing the resin by applying heat and pressure in a continuous or discontinuous press to obtain a laminated product.

Typical press parameters are 40 bar pressure and a temperature of 160-200° C. with a pressing time of 12-30 seconds. The surface layer has generally a thickness of 0.1-0.2 mm, the thickness of the HDF core varies between 6-12 mm and the balancing layer is about 0.1-0.2 mm thick.

This production method and product produced by such methods are generally referred to as the DPL process and DPL products (Direct Pressure Laminate)

Recently new panels with a wood powder based surface have been developed. Powder comprising wood fibres, binders preferably melamine particles, aluminium oxide particles and colour pigments are scattered on a HDF board and pressed under heat and pressure in a continuous or discontinuous press to obtain a product with a paper free and solid surface layer. The press parameters are similar to DPL. A higher pressure of 40-80 bar and a longer pressing time of 20-40 seconds may be used when the surface is formed with deep embossing and a thickness of for example 0.4-0.6 mm. The pressing temperature is generally 160-200° C. Such wood fibre based floors, generally referred to as WFF floors, have considerably better properties than traditional laminate floors since a ticker and more impact-resistant and wear-resistant surface may be produced in a cost efficient way.

FIGS. 1a-1d show production of a laminate or WFF floor panel according to known technology.

Figure 1A:
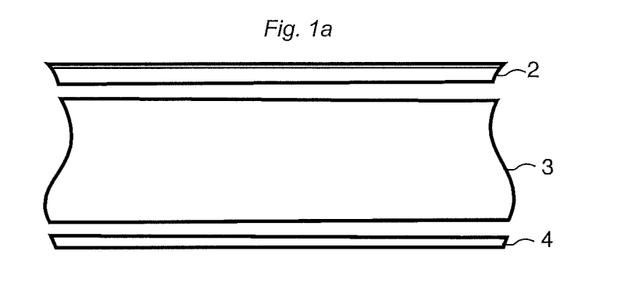
FIGS. 1a-1d show known production of a floor panel according to known technology.
Figure 1B:
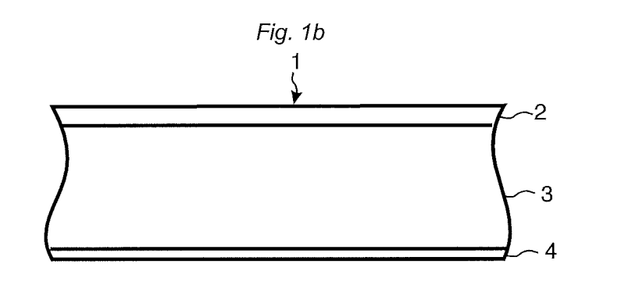

A surface layer 2 of an impregnated overlay and a decorative paper or a powder layer is applied on the upper part of a HDF core 3. A balancing paper or powder-backing layer 4 is applied on the backside of the HDF core as shown in FIG. 1a. The core 3 with the upper 2 and lower 4 layers is moved into a press and pressed under heat and pressure such that the layers are cured and attached to the board as shown in FIG. 1b.

The layers on the front face and the rear face are exposed to a first shrinking when the thermosetting resin in the upper and lower layer cures during pressing. The backing layer at the rear face balances the tension that is created by the surface layer of the front face and the panel is substantially flat with a small convex backward bending when it leaves the press. Such first shrinking and balancing of the panel is below referred to as "pressing balancing". The second temperature shrinking, when the panels is cooled from about 160-200° C. to room temperature, is also balanced by the backing layer and the panel 1 is essentially flat as shown in FIG. 1b. The second balancing is below referred to as "cooling balancing". A small convex backward bending is preferred (not shown) since this counteracts upward bending of the edges in dry conditions when the relative humidity may go down to 20% or lower during wintertime.

The problem is that this essentially flat panel comprises tension forces caused by the shrinking of the surface and balancing layers.

Figure 1C:
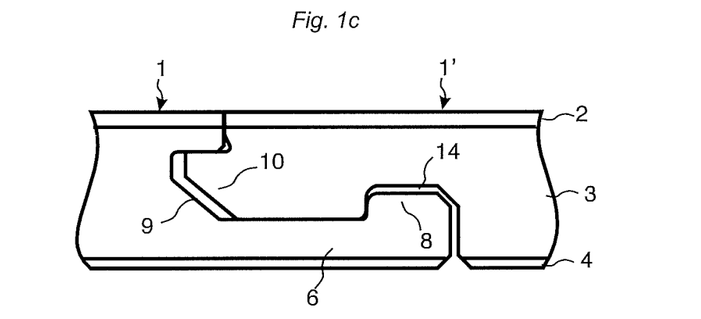

The panel is generally cut into several elements and formed into floor panels with locking systems on long and short edges as shown in FIG. 1c. The locking system may comprise, for example, generally a tongue 10 and a tongue groove 9 for vertical locking and a strip 6 with a locking element 8 that cooperates with a locking groove 14 for horizontal locking.

The surface and the core will swell in summertime when the indoor humidity is high and shrink in wintertime when the indoor humidity is low. The panels will shrink and expand and a cupping of the edges may take place. The balancing layer is used to counteract such cupping. This balancing is referred to as "climate balancing".

Figure 1D:
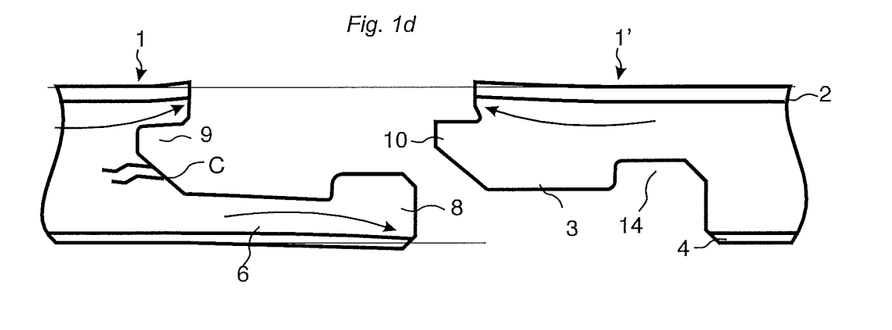

FIG. 1d show that the internal tension may cause problems when the locking system is formed and especially when the panel is installed in a dry climate, which causes the layers to shrink. A so called topping of the edges may occur when the internal tension opens up the groove 9 and bends the tongue part 10 upwards due to the fact that these parts are no longer balanced when the locking system is formed. The internal tension may also cause a backward bending of the strip 6, which decreases the locking strength and the quality of the locking system. The tension may be higher than the internal bonding strength of the core, which may cause cracks C, primarily in horizontally extending grooves, such as the tongue groove 9. Such internal tension may require a higher board quality than normal and this may increase the costs.

It would be a major advantage if the tension caused by the curing and temperature shrinking could be reduced or completely eliminated. Such a tension reduction would be especially favourable in WFF floors that generally comprise rather thick solid surface layers with considerable amount of thermosetting binders or high quality DPL floors for commercial application where the thickness and the resin content of the surface layer is higher than in DPL floors for domestic use.

SUMMARY OF THE DISCLOSURE AND OBJECTS THEREOF

An overall objective of embodiments of the present disclosure is to provide a method to reduce or eliminate tension in panels with a surface comprising thermosetting resins that is cured and connected to a core under heat and pressure. Embodiments of the present disclosure may combine various process flexibility and product features as listed below.

A first aspect of the disclosure is a method for producing a panel, for example a building panel, preferably a floor panel, with a wood based core and a surface layer comprising a thermosetting resin wherein the method comprising the steps of:

curing and connecting the surface layer to the core under heat and pressure in a first main pressing step;

applying a bending force on the panel after the first main pressing step such that it bends backwards away from the surface layer in hot condition; and releasing the bending force such that the panel springs back in an essentially flat shape.

In an embodiment, the surface layer may be directly connected to the core. In an embodiment, the surface layer may be connected to an intermediate layer, the intermediate layer being directly connected to the core.

The method may further comprise the step of decreasing the surface temperature during bending.

The temperature decrease may be about 20° C.

The temperature decrease may be more than 20° C.

The resin may be a melamine formaldehyde resin.

The method may comprise a bending that is at least about 3 cm/m.

The surface layer may comprise wood fibres and wear resistant particles.

The surface layer may comprise wood fibres, wear resistant particles and colour pigments.

A second aspect of the disclosure is a floor panel comprising a wood based core and a surface layer comprising a thermosetting resin produced according to the first aspect and that the panel has no balancing layer.

The floor panel according to the second aspect may have a back face, which is the wood based core.

The floor panel may be a DPL panel comprising a surface layer of impregnated paper bonded to a HDF core.

The floor panel may be a WFF panel comprising a powder based surface layer.

BRIEF DESCRIPTION OF THE DRAWINGS

The disclosure will in the following be described in connection to exemplary embodiments and in greater detail with reference to the appended exemplary drawings, wherein.

DESCRIPTION OF EMBODIMENTS OF THE DISCLOSURE

Figure 2A:
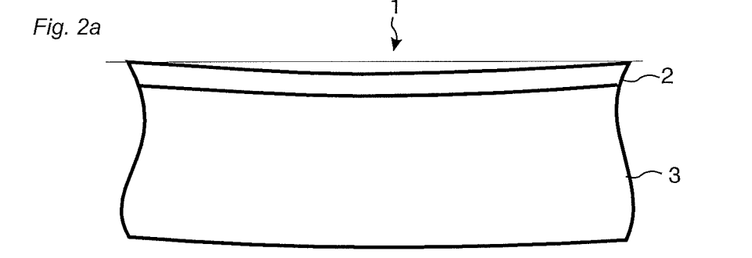
FIGS. 2a-2d show production of a panel according to a first embodiment of the disclosure.

FIG. 2a shows a panel 1 that has been pressed with only a surface layer 2 applied on a core 3. The panel may be a DPL panel or a WFF panel. The shrinking of the surface layer 2 during pressing, when the thermosetting resin has cured, causes the panel edges 1 to bend upwards. The bending may increase further when the panel 1 is cooled down to room temperature. The bending is such that the panel 1 is not possible to use for flooring production. The reason is that there is no backing layer that balances the shrinking of the surface layer 2 during pressing and cooling.

The panel has essentially the same surface temperature as the press table when it leaves the press. A normal pressing temperature is about 170° C. The core has generally a much lower temperature of about 80-100° C. This means that the surface layer will cool down very quickly after the pressing. After 10 seconds, the surface temperature may be 120° C. and after 15-20 seconds only about 80° C. The cooling of the surface and the core is effected by the pressing time. A longer pressing time will increase the core temperature more than a short pressing time.

Figure 2B:
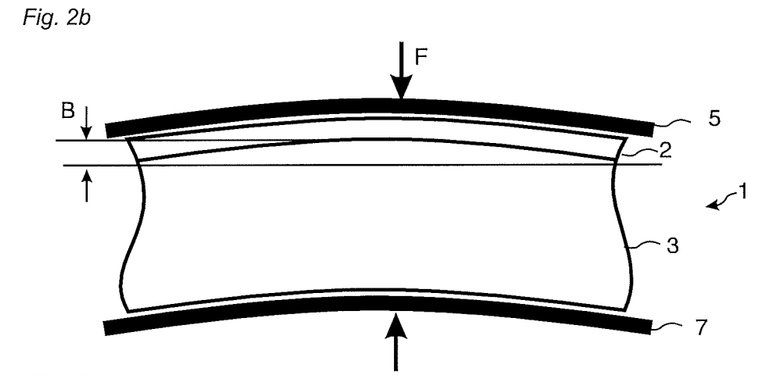

FIG. 2b shows that the panel 1 is pressed in a second pressing step between curved pressing tables 5, 7 when the surface layer 2 is still hot after the first pressing step. If such post pressing is made at a temperature of about 70-90° C., it will deform the hot HDF core and create a counter pressure that is sufficient to produce a flat panel without a backing layer. A plastic non-reversible deformation will take place.

A post pressing at higher surface temperatures will also stretch and deform the surface layer 2 and eliminate the tension caused by the shrinking in the first main pressing step. Such surface stretching is preferably made at temperatures around 140-160° C.

Figure 2C:
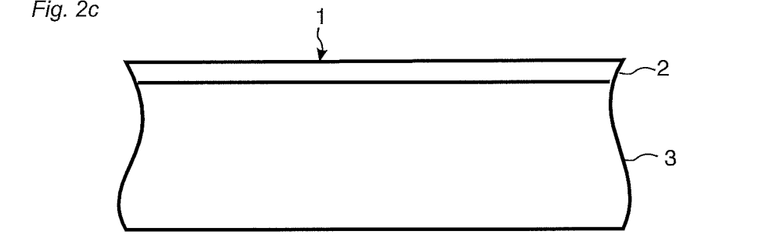

The second pressing and surface stretching step is preferably a cold pressing and it is an advantage if the panel is moved to the second pressing and bending station as soon as possible in order to maintain a high initial surface temperature when the bending starts. For example, the peak surface temperature may be in the range of 160-200° C., for example at about 170° C. during the first pressing, where the surface layer is connected to the core. When the bending step starts the surface temperature may be at least at 140° C., or at least 120° C. For example, when the bending may step starts the surface temperature may be within 30° C., or within 40° C., or within 50° C., of the peak surface temperature during the first pressing, where the surface layer is connected to the core. A decrease of the temperature in bended and stretched position will generally be obtained automatically when the core cools down the surface. This will stabilize the surface layer in a stretched position and a permanent deformation may be obtained. Internal tension in the panel may be reduced considerably or completely eliminated and the panel may be completely flat when it is cooled to room temperature as shown in FIG. 2c.

The production balancing and the cooling balancing that is made with a backing layer may be replaced partly or completely with plastic deformation.

The bending may be such that the panel is convex and bends backwards when it leaves the second pressing station. The panel may be slightly bended in a third strep upwards towards the surface such that a pre-determined shape is obtained. This type of overstretching and double bending may reduce the internal tension completely. The temperatures, bending time and bending magnitude should be adapted to the quality and specification of the surface and the core.

Heat may be added in the second surface-stretching step in order to improve and control the stretching and to adapt the production method to various surface thickness and resins. The surface may also be cooled in order to stabilize the panel in a pre-determined condition.

The second post pressing operation and the bending of the panel may be made in several ways. It is preferred that the bending and stretching is three-dimensional such that the bending is made along and across the panel. The press tables are preferably curved in two perpendicular directions like a top of a ball.

The backward bending may also be made with pressing cylinders, frames, pressing against a rubber or silicone matrix, with rollers and in many other ways where the panel is bended in hot condition after the initial main pressing operation where the thermosetting resin is cured.

The thermosetting resin may be adapted such that it is easy to stretch. Resins similar to the types used in so-called post-forming laminate qualities may facilitate surface stretching by bending.

The surface layer may also be stretched by lateral pulling forces applied at the panel edges.

It is also possible to heat up the panel again after cooling in a separate production step with for example a hot press table, infra-red lamps and similar in order to soften and stretch the surface layer in order to obtain a flat panel. A first cylinder may bend the panel backwards along the length and a second cylinder may, after preferably an intermediate heating, bend the panel along the width. The panels may also be held in a bended position in the cooling part after the pressing.

Figure 2D:
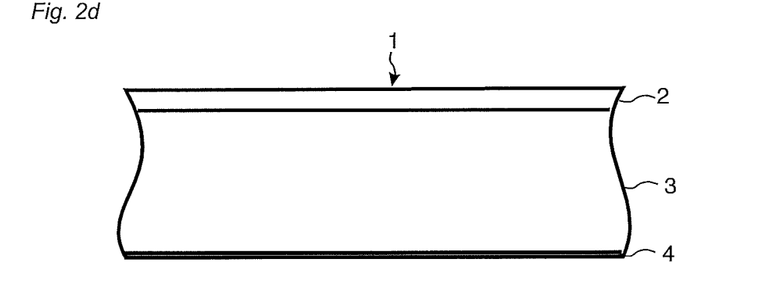

FIG. 2d shows that a moisture barrier 4 may be used of for example a plastic foil, treated paper, foam etc. in order to prevent moisture to penetrate into the panel from the sub floor. Such a backing layer may be used to obtain the climate balancing. In some application the bending of the HDF core may be sufficient even for the climate balancing.

The Surface Stretching Process (SSP) according to embodiments of the disclosure may offer one or more or all of the following advantages:
- a more cost efficient board with lower internal bonding strength may be used;
- topping that causes high wear at the edges and decreases locking strength due to internal tension may be eliminated;
- splitting of the board in the locking system may be avoided; and
- cost savings may be obtained by eliminating the backing or replacing the paper/melamine backing with a thinner or more cost efficient material.

Figure 3A:
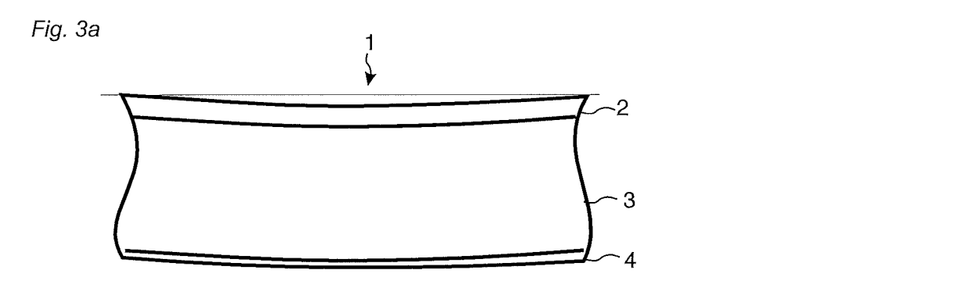
FIGS. 3a-3d show production of a panel according to a second embodiment of the disclosure.
Figure 3B:
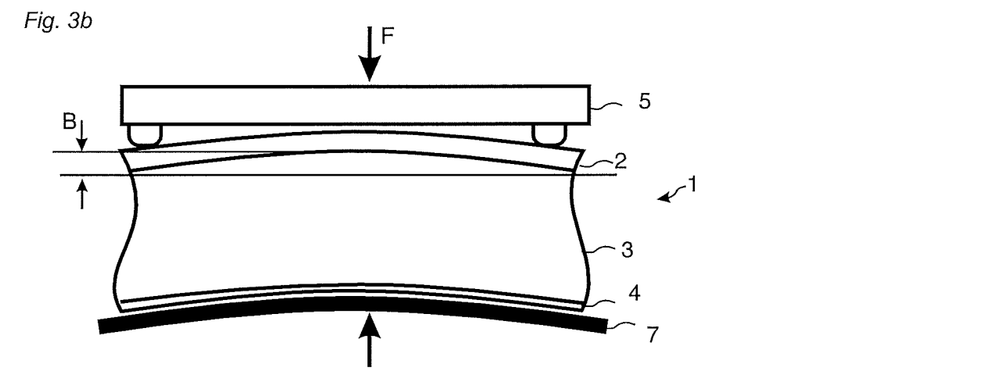
Figure 3C:
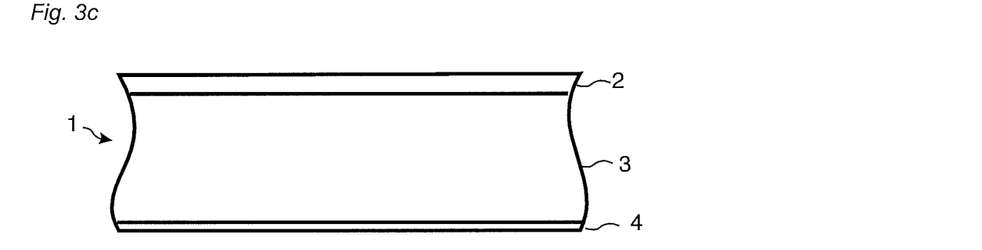
Figure 3D:
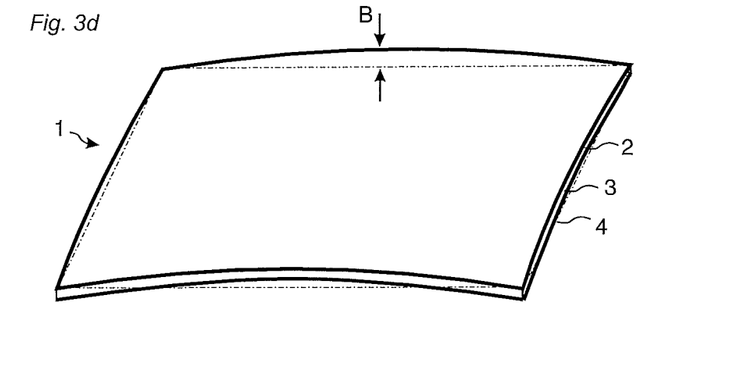

FIG. 3a shows an embodiment with a thin backing layer 4 that is not able to balance the panel 1 after initial pressing. FIG. 3b shows bending and preferably also stretching of the surface layer 2. The result is a flat panel as shown in FIG. 3c with a backing layer 4 and reduced internal tension. The backing layer prevents moisture to penetrate into the backside of the panel 1 and will stabilize the panel when humidity changes. FIG. 3d shows three-dimensional bending of a panel 1. The magnitude of the bending B is preferably about 3-6 cm/m or more.

Figure 4A:
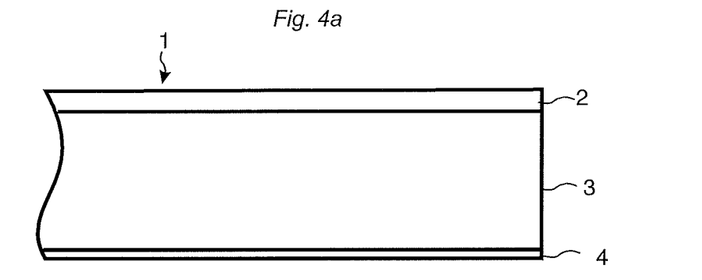
FIGS. 4a-4c show a method to measure internal tension in a panel.
Figure 4B:
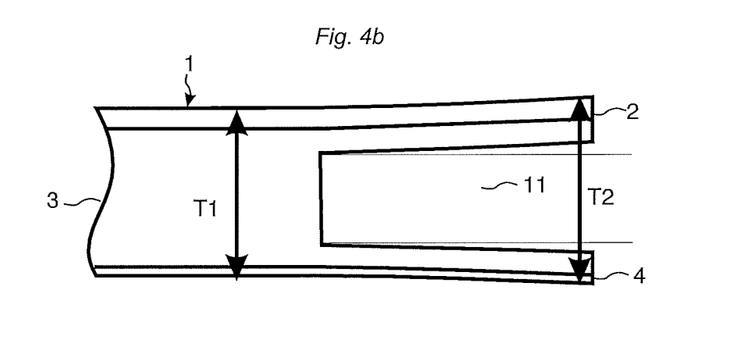
Figure 4C:
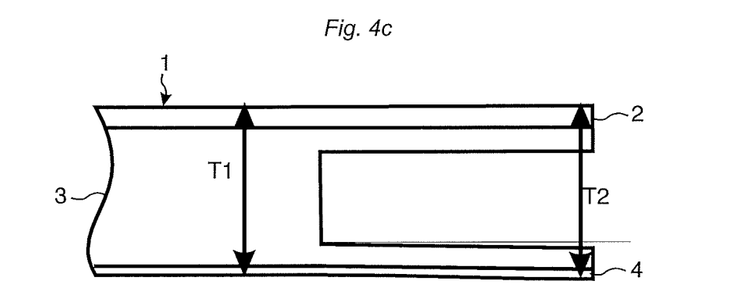

FIGS. 4a-4c show a method to measure internal tension in a panel. A groove 11 is formed in the panel edge. A high internal tension will separate the edges as shown in FIG. 4b. A large difference between the inner panel thickness T1 and the outer panel thickness T2 means that the panel 1 has a large internal tension that may cause topping and cracks in the locking system, especially in dry conditions. FIG. 4c shows a panel 1 with a low internal tension. For example, a panel with a reduced internal tension will have a T2 that is lower than a T2 for the same panel that did not have method, such as the bending step, performed on the panel.

This measuring method may be used to adjust the parameters of the backwards bending in the second pressing step by modifying initial pressing temperature, final pressing temperature, pressing time and the magnitude of the bending.

Figure 5A:
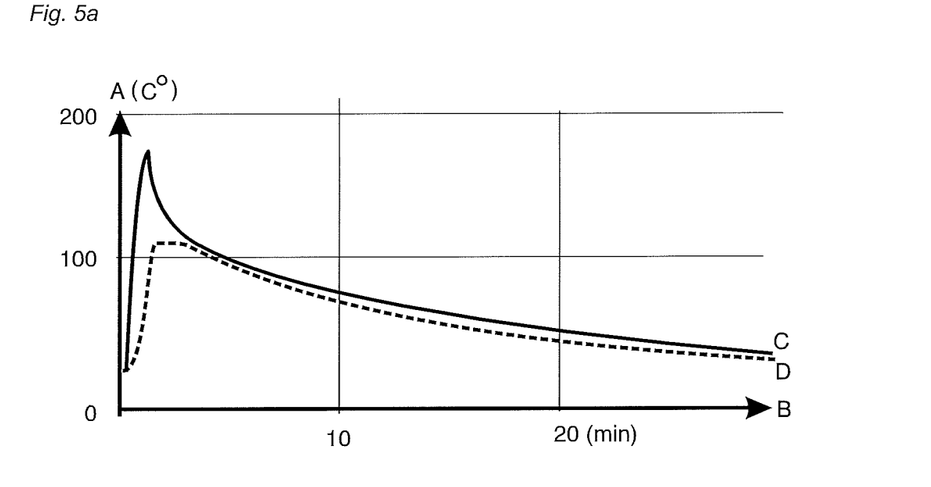
FIGS. 5a-5b show the panel temperature during pressing and cooling.
Figure 5B:
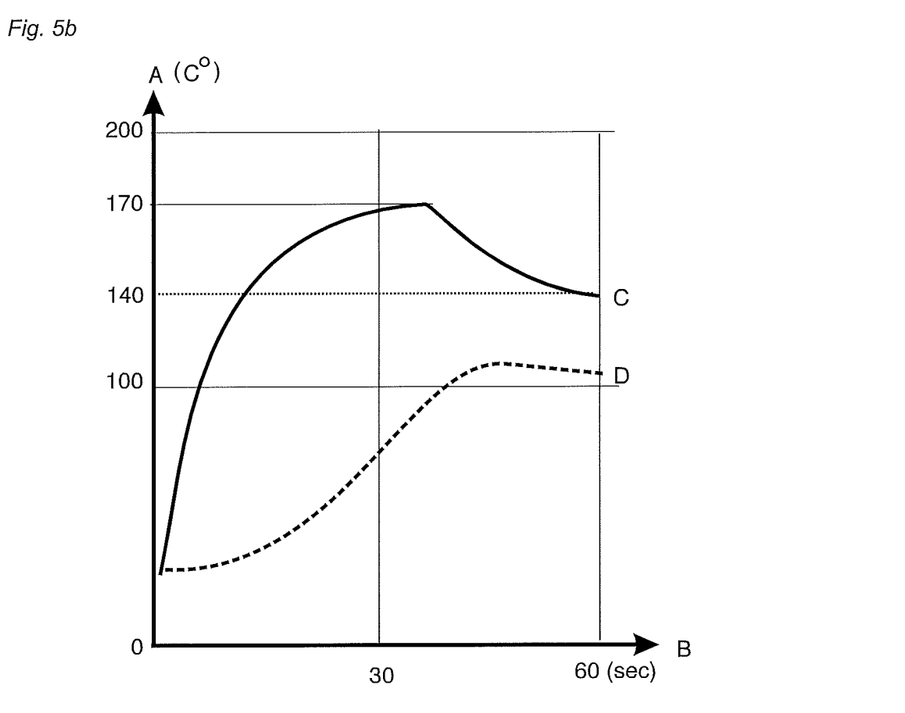

FIG. 5a shows the temperature curve during pressing of a WFF floor panel with a 0.5 mm surface layer. The temperature A is measured in ° C. and the time B in minutes. The upper curve C is the temperature of the surface layer and the lower curve D is the temperature of the core measured 3 mm below the surface. The surface temperature is increasing during pressing to 170° C. and the core temperature to about 110° C. The cooling of the surface layer takes place rather quickly as may be seen from FIG. 5b that shows the same temperature curves C and D during the first 60 seconds. For example, the bending step may start within 60 seconds or less, or 90 second or less, from when the first pressing starts. For example, the bending step may start within 30 seconds or less, from when the first pressing step ends. The plastic deformation is preferably made when the surface temperature is at least about 140° C. and when the core temperature, measured a few mm below the surface, is at least about 100° C. It is possible to modify the resins in the core and in the surface layer such that plastic deformation may be made at lower temperatures for example at 120-140° C. for the surface layer and 80-100° C. for the core.

Figure 6A:
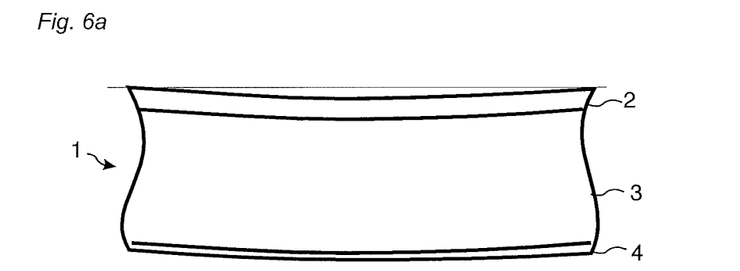
FIGS. 6a-6d show a method to obtain plastic deformation in a panel.
Figure 6B:
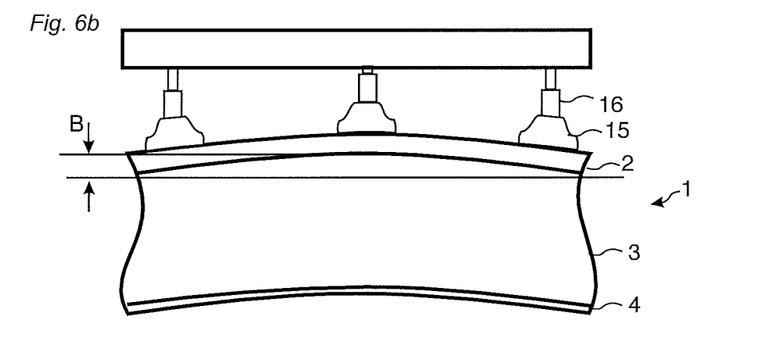
Figure 6C:
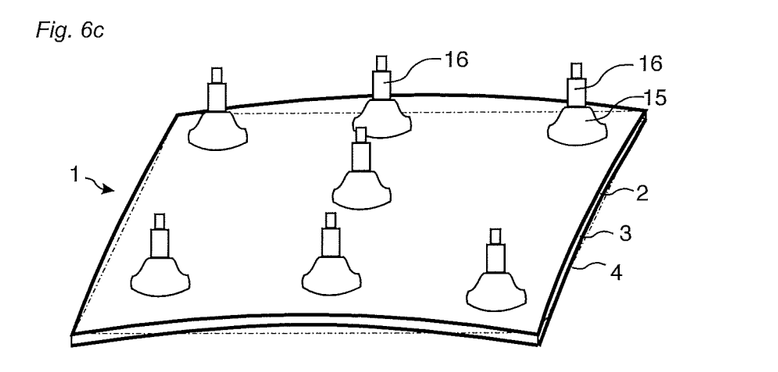
Figure 6D:
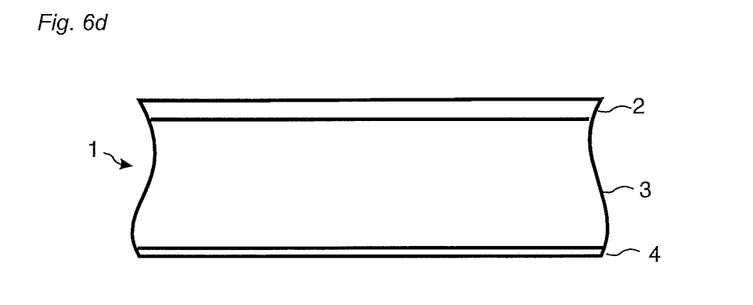

FIGS. 6a-6d show that vacuum cups 15 with adjustable cylinders 16 may be used to bend the pressed panel 1 after pressing. The vacuum cups may lift the panel immediately after pressing and form it to a pre-determined shape as shown in FIGS. 6b and 6c. Such forming may be made within for example 10-20 seconds after the pressing when the panel surface still has a temperature around and above 140° C. The panel is kept in a bended position until it cools down to a suitable temperature, preferably below 100° C., and a permanent non reversible plastic deformation is obtained such that the panel is essentially flat at room temperature as shown in FIG. 6d.

PROPHETIC EXAMPLE

Second Pressing and Stretching Step

| | |
|---|---|
| Panel size | 1200 * 2400 * 9 mm |
| Surface | 500 gr. powder mix/m2 |
| Initial pressing temperature | 140-160° C. |
| Second pressing temperature | 80-140° C. |
| Pressing time | 5-15 sec |
| Bending-width | 5 cm |
| Bending-length | 14 cm |

The invention claimed is:

1. Method for producing a panel, wherein the method comprises:
   providing a high-density fibreboard (HDF) core and a surface layer, wherein the surface layer comprises a thermosetting resin;
   curing and connecting the surface layer to the HDF core under heat and pressure for forming a panel, thereby raising a temperature of the surface layer above an initial temperature;
   bending the core and the surface layer of the panel after said curing and connecting by applying an external bending force by a bending device on at least a portion of the panel while the surface layer is still above the initial temperature; and releasing the bending force such that the panel springs back towards a flat shape.

2. The method according to claim 1, wherein the panel undergoes a plastic non-reversible deformation.

3. The method according to claim 1, further comprising providing a backing layer and connecting the backing layer to the HDF core.

4. The method according to claim 1, wherein the panel is bended such that an uppermost surface of the panel is convex and a lowermost surface of the panel is concave while the panel is still above the initial temperature.

5. The method according to claim 1, wherein the panel is bended under cooling of the panel.

6. The method according to claim 1, further comprising decreasing the temperature of the surface layer during bending.

7. The method according to claim 6, wherein the decreasing temperature of the surface layer is more than 20° C.

8. The method according to claim 1, wherein the bending is at least about 3 cm/m.

9. The method according to claim 1, wherein the surface layer comprises wood fibres and wear resistant particles.

10. The method according to claim 9, wherein the surface layer further comprises colour pigments.

11. The method according to claim 1, wherein the surface layer comprises impregnated paper which is bonded to the HDF core.

12. The method according to claim 1, wherein the surface layer comprises a powder based layer.

13. The method according to claim 1, wherein the bending force is applied to at least two opposite edge portions of the panel.

14. The method according to claim 1, wherein the panel is rectangular and the bending force is applied to both sets of opposite edge portions of the panel.

15. The method according to claim 1, wherein the bending force is applied with a first press table on an uppermost surface of the panel and a second press table on a lowermost surface of the panel.

16. The method according to claim 15, wherein the first press table and the second press table are curved in two perpendicular directions, such that bending is made along and across the panel.

17. The method according to claim 1, wherein the panel is bended by lifting the panel.

18. Method for producing a panel, wherein the method comprises:

providing a high-density fibreboard (HDF) core and a surface layer, wherein the surface layer comprises a thermosetting resin;

curing and connecting the surface layer to the HDF core under heat and pressure for forming a panel, thereby raising a temperature of the surface layer above an initial temperature;

bending and stretching the panel after said curing and connecting by applying one or more external forces on at least a portion of the panel while the surface layer is still above the initial temperature; and releasing the one or more forces such that the panel springs back towards a flat shape.

19. The method according to claim 18, wherein one force is a bending force and one force is a stretching force.

20. The method according to claim 19, wherein the stretching force is lateral pulling forces applied at the panel edges.

21. The method according to claim 18, wherein the curing and connecting occur in a first pressing step and said bending is performed after said curing and connecting in a second pressing step.

22. Method for producing a panel, wherein the method comprises:

providing a high-density fibreboard (HDF) core and a surface layer, wherein the surface layer comprises a thermosetting resin;

curing and connecting, in a first pressing step, the surface layer to the HDF core under heat and pressure for forming a panel, thereby raising a temperature of the surface layer above an initial temperature;

bending the core and the surface layer of the panel, after said curing and connecting in a second pressing step, by applying an external bending force by a bending device on at least a portion of the panel while the surface layer is still above the initial temperature; and releasing the bending force.

23. The method according to claim 1, wherein the bending device is a press.

24. The method according to claim 1, wherein the bending device is a press with curved pressing tables.

25. The method according to claim 1, wherein the bending device comprises vacuum cups.

* * * * *